United States Patent [19]

Graf

[11] Patent Number: 4,642,930
[45] Date of Patent: Feb. 17, 1987

[54] FISHING APPARATUS FOR AUTOMATICALLY BOBBING THE BAIT AND SIGNALLING A CATCH

[76] Inventor: Warren D. Graf, 16 Meadowlark Dr., Fairport, N.Y. 14450

[21] Appl. No.: 802,684

[22] Filed: Nov. 29, 1985

[51] Int. Cl.⁴ ............................................. A01K 97/12
[52] U.S. Cl. ......................................... 43/19.2; 43/17
[58] Field of Search ................... 43/19.2, 21.2, 15, 16, 43/17; 308/2 R; 248/521, 542

[56] References Cited

U.S. PATENT DOCUMENTS

| | | | |
|---|---|---|---|
| 1,316,043 | 9/1919 | Kaiser | 308/2 R |
| 2,642,690 | 6/1953 | Soenksen | 43/15 |
| 2,663,962 | 12/1953 | King | 43/17 |
| 3,190,026 | 6/1965 | Roszak | 43/17 |

OTHER PUBLICATIONS

"Judge", cartoon labeled Oct. 1, 1910, Seslie–Judge Co.

Primary Examiner—Nicholas P. Godici
Assistant Examiner—G. M. Reid

[57] ABSTRACT

Fishing apparatus which automatically effects mechanical bobbing of a baited hook on a fishing line and signals when a fish has taken the bait. The apparatus includes an elongated member adapted to have a fishing line connected adjacent to one end. The elongated member is adjustably mounted on a substantially horizontal fulcrum in a first position where it is substantially horizontally balanced on such fulcrum, or a second position where it is remote from the horizontal to generate a signal indicating that a fish has taken a baited hook of the fishing line. In the first position the elongated member is oscillated about the fulcrum to move such member in a manner for reciprocation of the fishing line to bob the baited hook on such line.

4 Claims, 5 Drawing Figures

FISHING APPARATUS FOR AUTOMATICALLY BOBBING THE BAIT AND SIGNALLING A CATCH

BACKGROUND OF THE INVENTION

This invention relates generally to fishing apparatus, and more particularly to apparatus for automatically bobbing fishing bait and signaling when a fish has taken such bait.

One of the most elementary methods for catching fish involves manually causing a baited hook on a fishing line to bob up and down in the water. Movement of the bait attracts the fish which then swallows the baited hook. The fisherman, aware of the fish taking the baited hook by a tug on the line, pulls on the line to set the hook and reel in the fish. This method is particuarly useful in ice fishing where fishing is accomplished through a hole in the ice. The fisherman is located directly over the hole in the ice and the vertical bobbing of the baited hook is readily effected over the area where the fish are located. However, since the bobbing is done manually only one hold may be attended at any one time. To expand the number of holes that may be attended by a single fisherman, various mechanisms for bobbing a fishing line have been proposed. Typically such mechanisms rely on wind action to cause bobbing and are therefore ineffective in sheltered areas or at locations where there is no wind. Moreover, with such mechanisms, signaling of a fish taking the bait has required complicated structures for sensing fishing line tension or releasing a signal flag for example.

SUMMARY OF THE INVENTION

This invention is directed to a fishing apparatus which automatically effects mechanical bobbing of a baited hook on a fishing line and signals when a fish has taken the bait. The apparatus includes an elongated member adapted to have a fishing line connected adjacent to one end. The elongated member is adjustably mounted on a substantially horizontal fulcrum in a first position where it is substantially horizontally balanced on such fulcrum, or a second position where it is remote from the horizontal to generate a signal indicating that a fish has taken a baited hook of the fishing line. In the first position the elongated member is oscillated about the fulcrum to move such member in a manner for reciprocation of the fishing line to bob the baited hook on such line.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
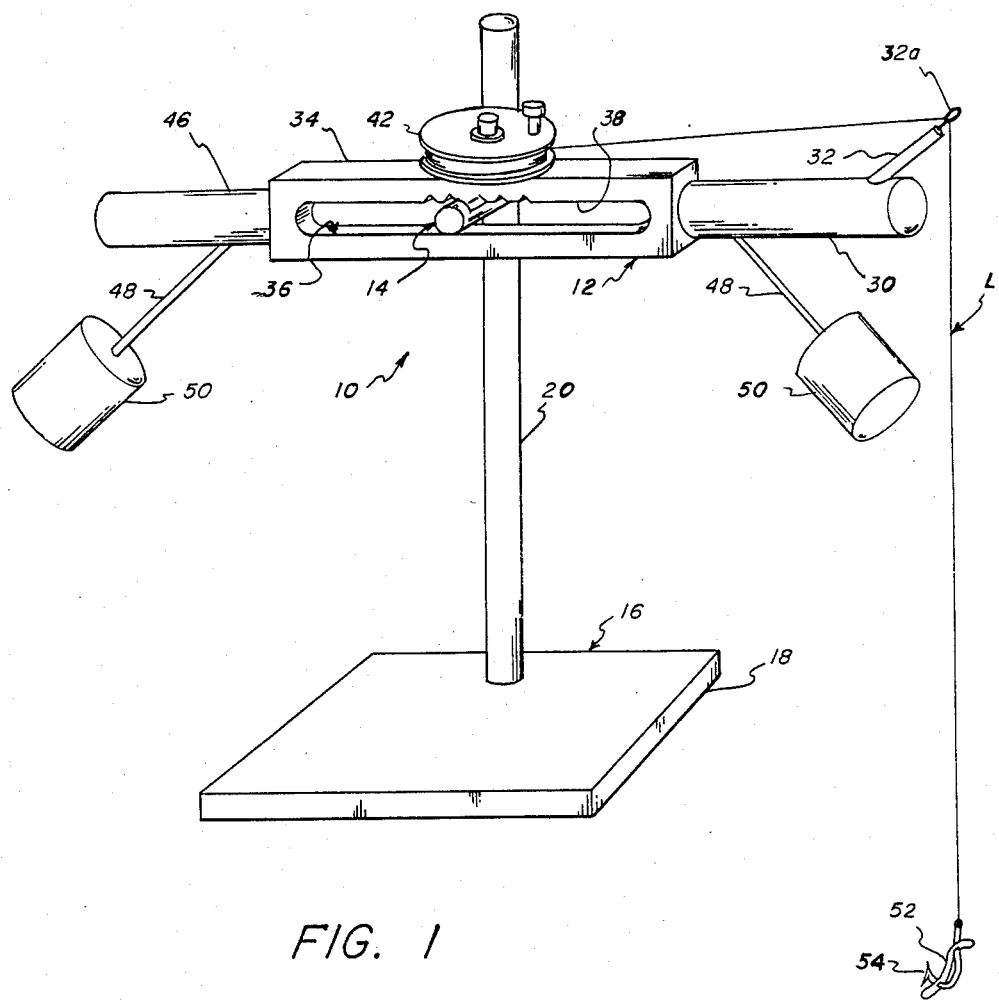
FIG. 1 is a view, in perspective, of the fishing apparatus according to this invention.

Referring now to the accompanying drawings, the fishing apparatus, generally designated by the numeral 10, includes an elongated member 12 adjustably located on a substantially horizontal fulcrum 14 of a support stand 16. The support stand 16 includes a planar base 18 to which a substantially vertical post 20 is attached. The base is adapted to be set on the ground or on the ice adjacent to the area to be fished. Of course, other support stands for the fulcrum 14, such as a tripod for example, are suitable for use with this invention.

The fulcrum 14, extending radially from the post 20 (see FIG. 1), includes a cylindrical body 22 having a particular shaped intermediate segment 24. The shape of the segment 24 defines a knife edge 26, parallel to the longitudinal axis of the body 22, bounded at its extremities by substantially vertical walls 28. The knife edge 26 provides the fulcrum point for the elongated member 12 and the walls 28 provide stops which prevent transverse movement of elongated member in the direction of the longitudinal axis of the body 22 for the purpose to be explained hereinbelow.

Figure 3:
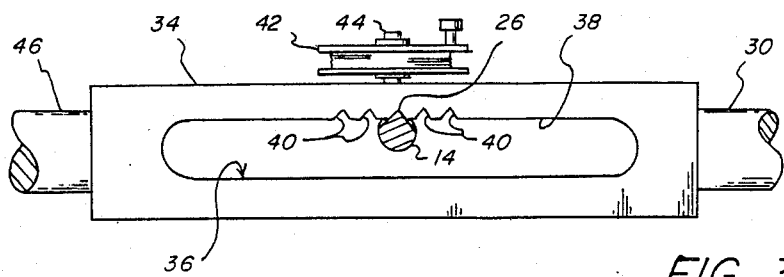
FIG. 3 is a side elevational view on an enlarged scale, of the portion of the fishing apparatus mounted on the fulcrum in its line bobbing position.

The elongated member 12 includes a first portion 30 having a fishing line support 32 attached adjacent to one end. A fishing line may be directly connected to the end of support 32 remote from portion 30; or as shown in FIG. 1, the support 32 may have a guide ring 32a secured to its end remote from portion 30 through which a fishing line L is threaded. A second intermediate portion 34, connected to the opposite end of portion 30, has a transverse slot 36 defined therein. The intermediate portion is adapted to have the fulcrum 14 received through the slot 36. The slot 36 has a first wall 38 having a plurality of transverse, parallel, V-shaped grooves 40. The shape of the grooves 40 substantially match the shape of the knife edge 26. Therefore, when the portion 34 is supported on the fulcrum 14, a selected one of the grooves receives the knife edge 26. In this manner, by selecting a particular groove 40, the portion 34 (and thus elongated member 12) can be adjustably located on the fulcrum 14 to assume a balanced, substantially horizontal, orientation (see FIG. 3). The portion 34 may also support a reel 42 for storing and selectively paying out the fishing line L. The reel 42 (of any well known construction) is mounted on a pivot shaft 44, the longitudinal axis of which passes substantially through the center of gravity of the portion 34. In this manner, the reel has a minimal effect on the balance of the elongated member 12 on the fulcrum 14.

A third portion 46 of the elongated member 12 is connected to the intermediate portion 34 opposite the first portion 30 and substantially aligned with such first portion. A pair of arms 48 are connected to and extend from the first and third portions 30 and 46 respectively. The included angle between the arms and their respective portions are equal, and the arms lie in a plane passing through the longitudinal axis of the elongated member 12 perpendicular to the slot 36. Weights 50 are respectively coupled to the arms 48 at substantially equal distances from the respective portions 30 and 46 measured along such arms.

The location of the arms 48 (and thus the weights 50) relative to a substantially vertical plane passing through the longitudinal axis of the fulcrum 14 is selected so that the elongated member is readily balanceable on the fulcrum 14. Further, the weights are selected to effect a pendulum action on the elongated member about the fulcrum after an external force (e.g., manual displacement in a vertical direction) is applied to the member. That is, an application of such external force, the weights cause the member 12 to oscillate to a limited degree about the fulcrum while maintaining its overall balance on the fulcrum 14. As a result, the portion of the fishing line L extending vertically from the line support 32 is mechanically reciprocated up and down. In this manner bait 52 on a hook 54 attached to the line L (see FIG. 1) is bobbed to attract a fish thereto.

Figure 4:
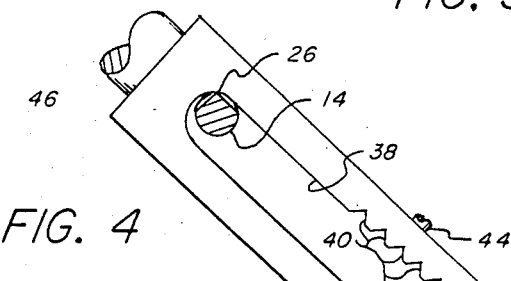
FIG. 4 is a side elevational view, similar to FIG. 3, with the portion of the fishing apparatus mounted on the fulcrum in its signaling position.
Figure 2:
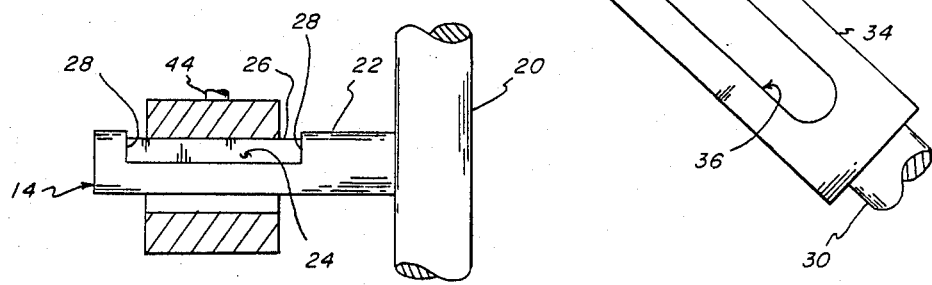
FIG. 2 is an end elevational view, on an enlarged scale, of the fulcrum of the fishing apparatus.
Figure 5:
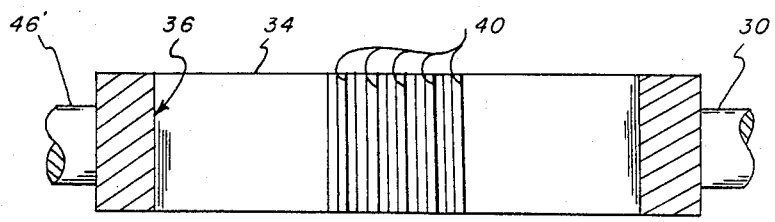
FIG. 5 is a cross-sectional view of the fulcrum mounting portion of the fishing apparatus taken on lines 5—5 of FIG. 3.

When a fish strikes and takes the baited hook, the vertical portion of the fishing line is pulled downward. This action tips the elongated member 12 about the fulcrum 14 beyond its balanced position. The elongated member then shifts to its position shown in FIG. 4, with the portion 46 extending in a generally upward direction. The stops defined by walls 28 of the body 22 of the fulcrum prevent the elongated member 12 from moving in a transverse direction (along the longitudinal axis of the fulcrum) and ensure that the movement of the elongated member is in the direction of its longitudinal axis. The elongated member thus is retained on the fulcrum 14. In this position, a visual signal that a fish has been hooked is given. The elongated member 12 can then be readily removed from the fulcrum 14 and the fish retrieved, such as by activating the reel to wind up the fishing line L.

The invention has been described in detail with particular reference to a preferred embodiment thereof, but it will be understood that variations and modifications can be effected within the spirit and scope of the invention.

I claim:

1. Fishing apparatus for automatically effecting mechanical bobbing of a baited hook on a fishing line and signaling when a fish has taken such bait, said apparatus comprising:

fulcrum means for providing a substantially horizontal fulcrum;

an elongated member adapted to have a fishing line connected to such member adjacent to one end thereof, said elongated member having a transverse slot defined therein, said slot having a first surface adjustably engageable with said fulcrum means where said elongated member is substantially horizontally balanced on said fulcrum means, and a second surface engageable with said fulcrum means where said elongated member is remote from the horizontal to generate a signal that a fish has taken the bait;

oscillation means, coupled to said elongated member, for effecting oscillation of said elongated member about said fulcrum means, whereby said one end of said elongated member to which a fishing line is connected vertically reciprocates such line for bobbing of a baited hook on such line to attract a fish;

and said first surface of said slot has a plurality of transverse grooves, and wherein said fulcrum means comprises a substantially horizontal member having an upstanding knife edge extending parallel to the longitudinal axis of such horizontal member and adapted to extend through said slot in selective engagement with one of said grooves whereby said first surface of said slot is supported on said knife edge and said elongated member is thereby adjustably mountable relative to said horizontal member to assume a balanced position on said knife edge.

2. The invention of claim 1 wherein said horizontal member of said fulcrum means further includes stop means at spaced locations along the longitudinal axis of said horizontal member to limit transverse movement of said elongated member relative to said horizontal member in the direction of such longitudinal axis.

3. The invention of claim 1 wherein said oscillation means comprises at least one weight coupled to said elongated member at a location whereby, when a force is appled to said elongated member, said at least one weight causes said elongated member to act as a pendulum and oscillate about said fulcrum means.

4. The invention of claim 1 further including a reel for storing fishing line, said reel being mounted on said elongated member at a location whereby balance of said elongated member in said first position is not affected.

* * * * *